United States Patent
Armstrong et al.

(10) Patent No.: US 12,506,158 B2
(45) Date of Patent: Dec. 23, 2025

(54) OPTIMIZED PROCESSING OF ELECTRODES FOR SOFC AND SOEC

(71) Applicant: Bloom Energy Corporation, San Jose, CA (US)

(72) Inventors: Tad Armstrong, San Jose, CA (US); Justin Railsback, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/152,362

(22) Filed: Jan. 10, 2023

(65) Prior Publication Data

US 2023/0223555 A1     Jul. 13, 2023

Related U.S. Application Data

(60) Provisional application No. 63/298,204, filed on Jan. 10, 2022.

(51) Int. Cl.

| | |
|---|---|
| *H01M 4/90* | (2006.01) |
| *C25B 1/04* | (2021.01) |
| *C25B 9/70* | (2021.01) |
| *H01M 4/86* | (2006.01) |
| *H01M 4/88* | (2006.01) |
| *H01M 8/12* | (2016.01) |
| *H01M 8/1213* | (2016.01) |
| *H01M 8/2432* | (2016.01) |

(52) U.S. Cl.
CPC ............ *H01M 4/9033* (2013.01); *C25B 1/04* (2013.01); *C25B 9/70* (2021.01); *H01M 4/8663* (2013.01); *H01M 4/8673* (2013.01); *H01M 4/8885* (2013.01); *H01M 8/1213* (2013.01); *H01M 8/2432* (2016.02); *H01M 2008/1293* (2013.01); *H01M 2300/0077* (2013.01)

(58) Field of Classification Search
None
See application file for complete search history.

(56) References Cited

U.S. PATENT DOCUMENTS

| | | |
|---|---|---|
| 8,268,502 B2 | 9/2012 | Nguyen et al. |
| 9,583,771 B2 | 2/2017 | Parihar et al. |
| 10,431,833 B2 | 10/2019 | Wilson et al. |
| 10,784,521 B2 | 9/2020 | El Batawi et al. |

(Continued)

OTHER PUBLICATIONS

Qu et al RSC Adv., 2021,11, 30911-30917 (Year: 2021).*

(Continued)

*Primary Examiner* — Louis J Rufo
(74) *Attorney, Agent, or Firm* — THE MARBURY LAW GROUP PLLC

(57) ABSTRACT

Techniques for fabricating a solid oxide electrolyzer cell (SOEC) including sintering an electrolyte, printing a fuel-side electrode disposed on a fuel side of the electrolyte, printing an air-side electrode disposed on an air side of the electrolyte, first sintering a combination of the electrolyte, fuel-side electrode, and air-side electrode, printing a barrier layer an air side of the electrolyte, printing a functional layer on the barrier layer, printing a collector layer on the functional layer, and second sintering a combination of the electrolyte, fuel-side electrode, air-side electrode, barrier layer, functional layer, and collector layer.

14 Claims, 7 Drawing Sheets

(56) References Cited

U.S. PATENT DOCUMENTS

| | | | | |
|---|---|---|---|---|
| 2006/0166070 | A1* | 7/2006 | Hickey | H01M 8/1246 |
| | | | | 264/618 |
| 2010/0129693 | A1* | 5/2010 | Nguyen | H01M 4/8867 |
| | | | | 204/192.15 |
| 2012/0043010 | A1* | 2/2012 | Batawi | H01M 8/124 |
| | | | | 427/559 |
| 2013/0284591 | A1* | 10/2013 | Delahaye | C25B 9/19 |
| | | | | 204/262 |
| 2014/0017579 | A1* | 1/2014 | Hata | C04B 35/6261 |
| | | | | 429/479 |
| 2014/0193743 | A1* | 7/2014 | Esposito | C04B 41/5353 |
| | | | | 429/495 |
| 2017/0054159 | A1 | 2/2017 | Armstrong et al. | |
| 2018/0166692 | A1* | 6/2018 | Yoon | H01M 4/8807 |
| 2018/0205096 | A1* | 7/2018 | Hiraiwa | H01M 8/0232 |
| 2019/0181458 | A1* | 6/2019 | Leming | H01M 4/9066 |

OTHER PUBLICATIONS

Qu (Year: 2021).*
Hiroaki Taguchi et al., "LNF SOFC cathodes with active layer using $Pr_6O_{11}$ or Pr-doped $CeO_2$", Journal of Power Sources, vol. 241 (May 30, 2013), pp. 768-775, XP028675817.
Search Report issued Aug. 11, 2023 in corresponding European Patent Application No. 23150902.7.

* cited by examiner

600

700

803

900

OPTIMIZED PROCESSING OF ELECTRODES FOR SOFC AND SOEC

FIELD OF THE INVENTION

The embodiments of the present invention generally relate to fuel cell technology, and more particularly, toward an optimized cell-processing scheme for electrodes for solid oxide fuel cells (SOFCs) and solid oxide electrolyzer cells (SOECs).

DISCUSSION OF THE RELATED ART

SOFCs and SOECs, sometimes collectively referred to as solid oxide reversible fuel cells (SORFCs) can be operated in a fuel cell mode to generate electricity by oxidizing a fuel. SORFC systems also can be operated in an electrolysis mode to generate hydrogen by electrolyzing water.

Operation of SORFCs results in a number of drawbacks. For example, related art SORFCs can suffer from air-side electrode degradation due to cell voltage increases that may occur during the electrolysis process. In another example, air-side electrodes with ceria-based sublayers have been developed to mitigate the delamination of the electrode at high current densities, but exhibit low over-potentials. Such air-side electrodes may have low degradation during long-term operation.

In order to utilize these air-electrode materials with the typical state-of-the-art electrolytes and fuel-side electrode systems, improved thermal processing is required during fabrication of the cells in order to achieve optimal microstructures and improved performance. Accordingly, the inventors have developed cell-processing techniques for SOEC/SOFC cell manufacturing.

SUMMARY OF THE INVENTION

Accordingly, the embodiments of the present invention are directed to an optimized cell processing techniques for electrodes for SOFC and SOEC that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optimized cell processing scheme for electrodes for SOFC and SOEC includes a SOFC/SOEC electrode system, comprising a barrier layer disposed between a cathode functional layer and an electrolyte.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%. In addition, weight percentages (wt %) and atomic percentages (at %) as used herein respectively refer to a percent of total weight or a percent of a total number of atoms of a corresponding composition.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "electrolyzer cell stack," as used herein, means a plurality of stacked electrolyzer cells that can optionally share a common water inlet and exhaust passages or risers. The "electrolyzer cell stack," as used herein, includes a distinct electrical entity which contains two end plates which are connected directly to power conditioning equipment and the power (i.e., electricity) input of the stack or comprises a portion of an electrolyzer cell column that contains terminal plates which provide electrical input.

Figure 1A:
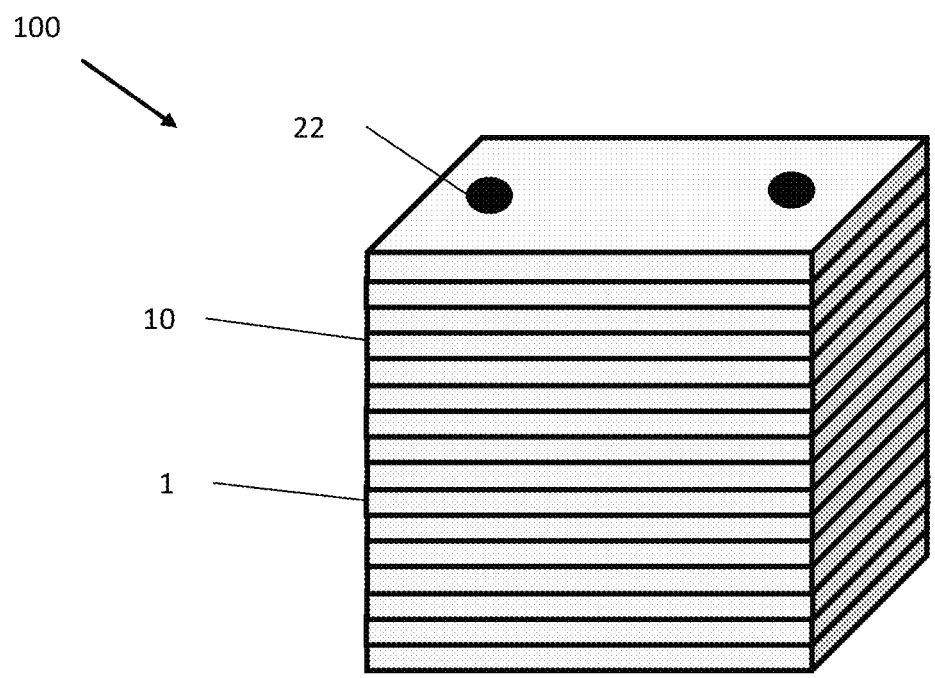
FIG. 1A is a perspective view of a SOEC stack, according to various embodiments of the present disclosure.
Figure 1B:
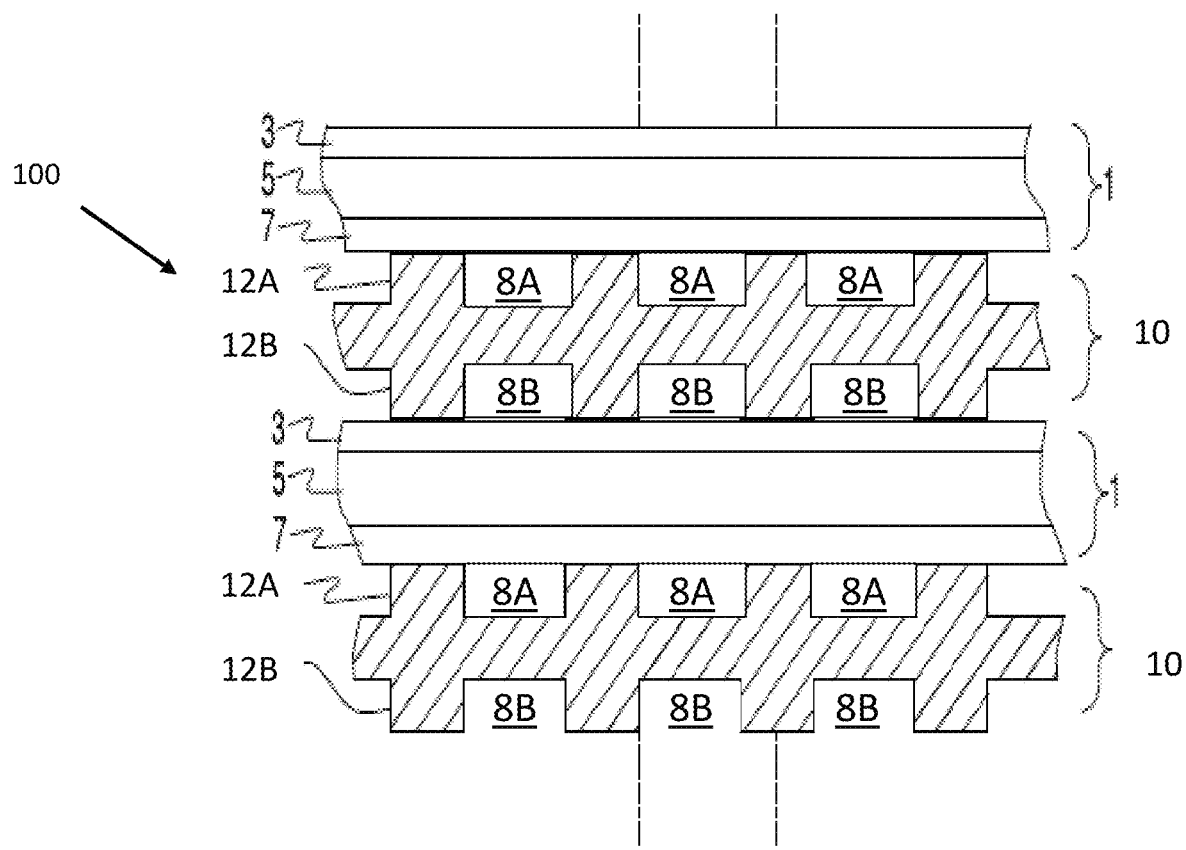
FIG. 1B is a cross-sectional view of a portion of the stack of FIG. 1A.

FIG. 1A is a perspective view of an electrolyzer cell stack 100, and FIG. 1B is a sectional view of a portion of the stack 100, according to various embodiments of the present disclosure. Referring to FIGS. 1A and 1B, the stack 100 may be a solid oxide electrolyzer cell (SOEC) stack that includes solid oxide electrolyzer cells 1 separated by interconnects 10. Referring to FIG. 1B, each electrolyzer cell 1 comprises an air-side electrode 3, a solid oxide electrolyte 5, and a fuel-side electrode 7.

Electrolyzer cell stacks are frequently built from a multiplicity of electrolyzer cells 1 in the form of planar elements, tubes, or other geometries. Although the electrolyzer cell stack 100 in FIG. 1 is vertically oriented, electrolyzer cell stacks may be oriented horizontally or in any other direction. For example, water may be provided through water conduits 22 (e.g., water riser openings) formed in each interconnect 10 and electrolyzer cell 1, while oxygen may be provided from the side of the stack between air side ribs of the interconnects 10.

Various materials may be used for the air-side electrode 3, solid oxide electrolyte 5, and fuel-side electrode 7. For example, the fuel-side electrode 7 may comprise a cermet layer comprising a metal-containing phase and a ceramic phase. The metal-containing phase may include a metal catalyst, such as nickel (Ni), cobalt (Co), copper (Cu), alloys thereof, or the like, which operates as an electron conductor. The metal catalyst may be in a metallic state or may be in an oxide state. For example, the metal catalyst forms a metal oxide when it is in an oxidized state. Thus, the fuel-side electrode 7 may be annealed in a reducing atmosphere prior to operation of the electrolyzer cell 1, to reduce the oxidized metal catalyst to a metallic state.

The metal-containing phase may consist entirely of nickel in a reduced state. This nickel-containing phase may form nickel oxide when it is in an oxidized state. Thus, the fuel-side electrode 7 is preferably annealed in a reducing atmosphere prior to operation to reduce the nickel oxide to nickel.

The ceramic phase of the fuel-side electrode 7 may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YbCSSZ), or the like. In the YbCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %, as disclosed in U.S. Pat. No. 8,580,456, which is incorporated herein, by reference.

The solid oxide electrolyte 5 may comprise a stabilized zirconia, such as scandia-stabilized zirconia (SSZ), yttria-stabilized zirconia (YSZ), scandia-ceria-stabilized zirconia (SCSZ), scandia-ceria-yttria-stabilized zirconia (SCYSZ), scandia-ceria-ytterbia-stabilized zirconia (SCYbSZ), or the like. Alternatively, the electrolyte 5 may comprise another ionically conductive material, such as a samaria-doped ceria (SDC), gadolinia-doped ceria (GDC), or yttria-doped ceria (YDC).

The air-side electrode 3 may comprise a layer of an electrically conductive material, such as an electrically conductive perovskite material, such as lanthanum strontium manganite (LSM). Other conductive perovskites, such as lanthanum strontium cobaltite (LSC), lanthanum strontium cobalt manganite (LSCM), lanthanum strontium cobalt ferrite (LSCF), lanthanum strontium ferrite (LSF), $La_{0.85}Sr_{0.15}Cr_{0.9}Ni_{0.1}O_3$(LSCN), etc., or metals, such as Pt, may also be used.

In some embodiments, the air-side electrode 3 may comprise a mixture of the electrically conductive material and an ionically conductive material. For example, the air-side electrode 3 may include from about 10 wt % to about 90 wt % of the electrically conductive material described above, (e.g., LSM, etc.) and from about 10 wt % to about 90 wt % of the ionically conductive material. Suitable ionically conductive materials include zirconia-based and/or ceria based materials. For example, the ionically conductive material may comprise scandia-stabilized zirconia (SSZ), ceria, and at least one of yttria and ytterbia. In some embodiments, the ionically conductive material may be represented by the formula: $(ZrO_2)_{1-w-x-z}(Sc_2O_3)_w(CeO_2)_x(Y_2O_3)_a(Yb_2O_3)_b$, wherein $0.09 \leq w \leq 0.11$, $0 < x \leq 0.0125$, $a+b=z$, and $0.0025 \leq z \leq 0.0125$. In some embodiments, $0.009 < x \leq 0.011$ and $0.009 \leq z \leq 0.011$, and optionally either a or b may equal to zero if the other one of a or b does not equal to zero.

Furthermore, if desired, additional contact or current collector layers may be placed over the air-side electrode 3 and the fuel-side electrodes 7. For example, a Ni or nickel oxide anode contact layer and an LSM or LSCo cathode contact layer may be formed on the fuel-side electrode 7 and the air-side electrode 3, respectively.

Each interconnect 10 electrically connects adjacent electrolyzer cells 1 in the stack 100. In particular, an interconnect 10 may electrically connect the fuel-side electrode 7 of one electrolyzer cell 1 to the air-side electrode 3 of an adjacent electrolyzer cell 1. FIG. 1B shows that the lower electrolyzer cell 1 is located between two interconnects 10. A Ni mesh (not shown) may be used to electrically connect the interconnect 10 to the fuel-side electrode 7 of an adjacent electrolyzer cell 1.

Each interconnect 10 includes fuel-side ribs 12A that at least partially define fuel channels 8A and air-side ribs 12B that at least partially define oxidant (e.g., air) channels 8B. The interconnect 10 may operate as a separator that separates water flowing to the fuel-side electrode of one cell 1 in the stack from oxygen flowing from the air-side electrode of an adjacent cell 1 in the stack. At either end of the stack 100, there may be an air end plate or fuel end plate (not shown).

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron (e.g., 5 wt % iron), optionally 1 or less weight percent yttrium and balance chromium alloy), and may electrically connect the fuel-side electrode 7 of one electrolyzer cell 1 to the air-side electrode 3 of an adjacent electrolyzer cell 1.

Figure 2A:
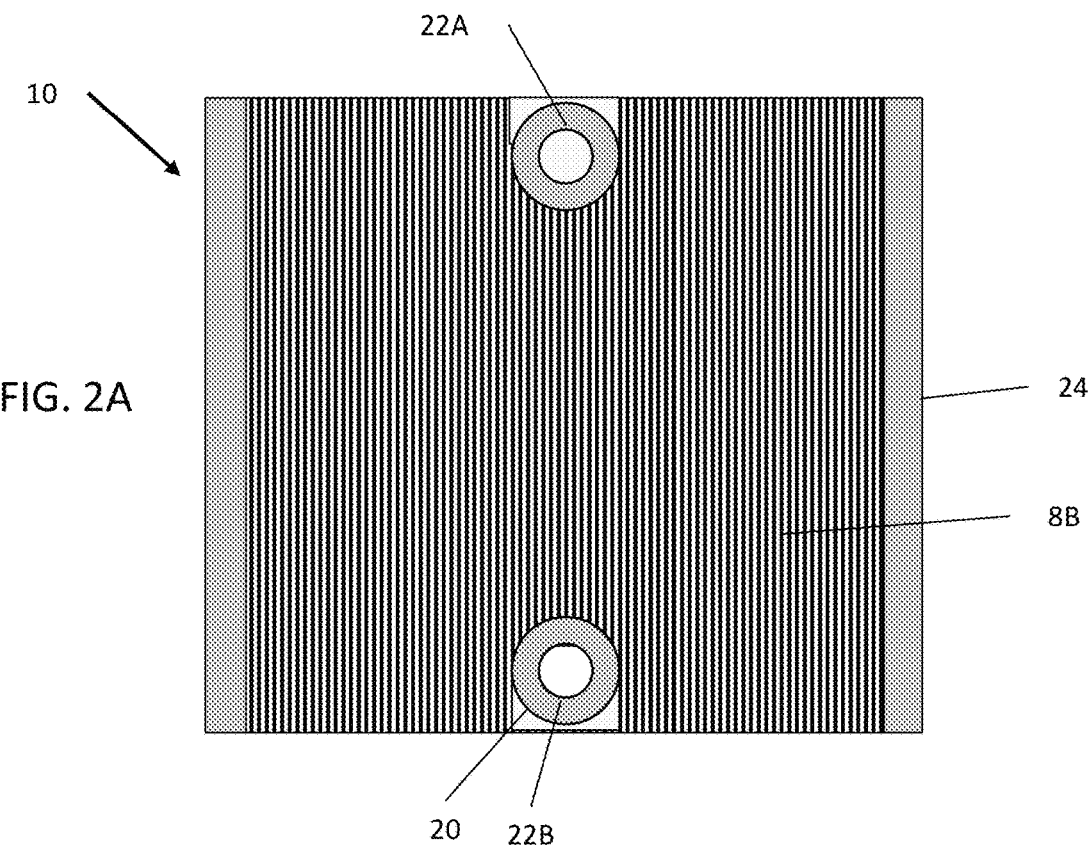
FIG. 2A is a plan view of an air side of an interconnect, according to various embodiments of the present disclosure.
Figure 2B:
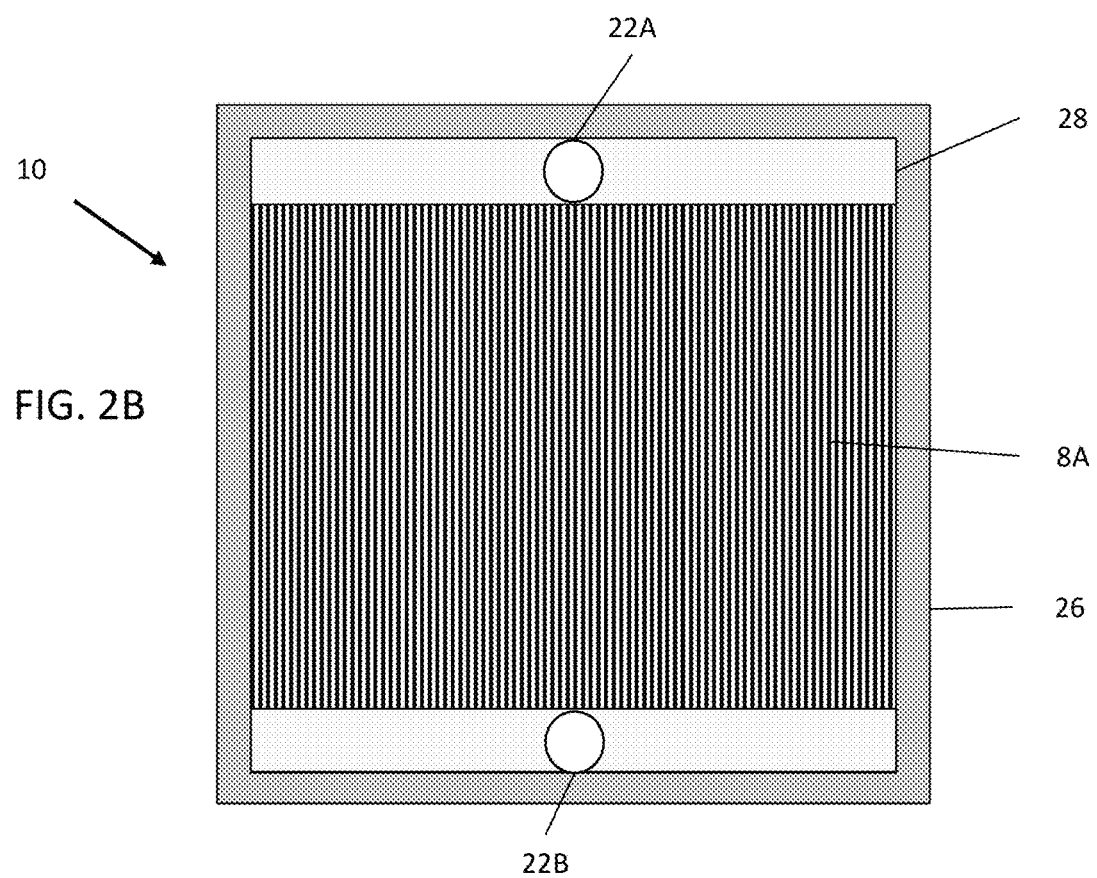
FIG. 2B is a plan view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B that extend from opposing first and second edges of the interconnect 10. Oxygen flows through the air channels 8B from the air-side electrode 3 of an adjacent electrolyzer cell 1. Ring seals 20 may surround fuel holes 22A, 22B of the interconnect 10, to prevent water from contacting the air-side electrode 3. Strip-shaped peripheral seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

Referring to FIGS. 1B and 2B, the fuel side of the interconnect 10 may include the fuel channels 8A and fuel manifolds 28. Water flows from one of the fuel holes 22A (e.g., inlet fuel hole that forms part of the fuel inlet riser), into the adjacent manifold 28, through the fuel channels 8A, and to the fuel-side electrode 7 of an adjacent electrolyzer cell 1. Excess water may flow into the other fuel manifold 28 and then into the outlet fuel hole 22B. A frame seal 26 is disposed on a peripheral region of the fuel side of the interconnect 10. The peripheral region may be an elevated plateau which does not include ribs or channels. The surface of the peripheral region may be coplanar with tops of the ribs 12A.

Figure 3A:
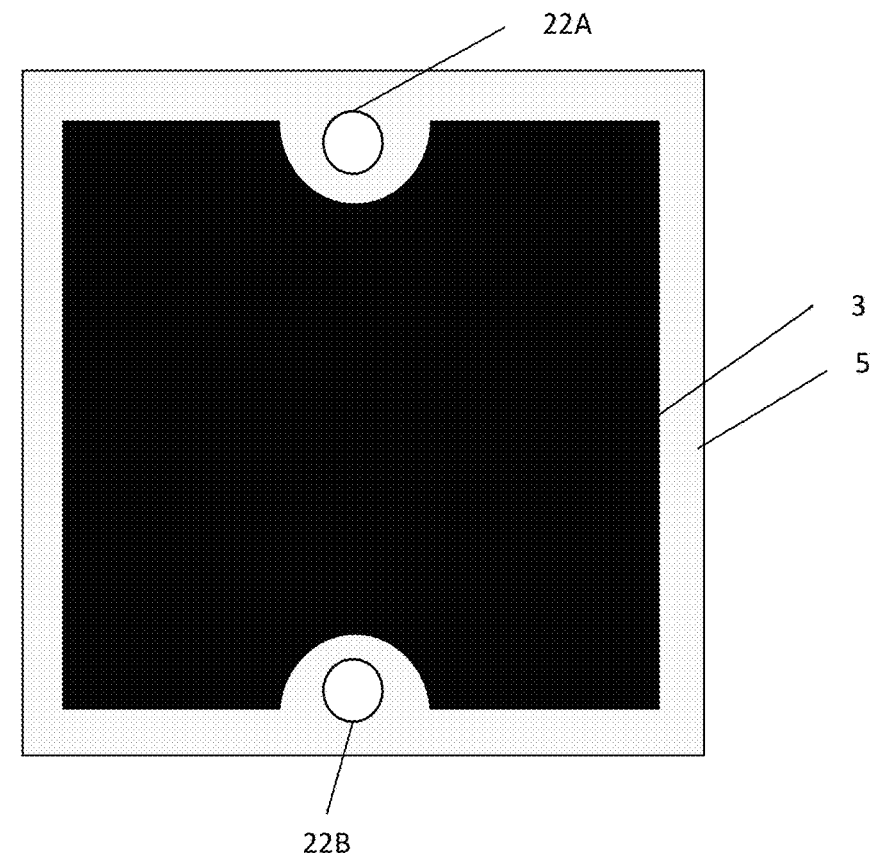
FIG. 3A is a plan view of an air side of a SOEC cell, according to various embodiments of the present disclosure.
Figure 3B:
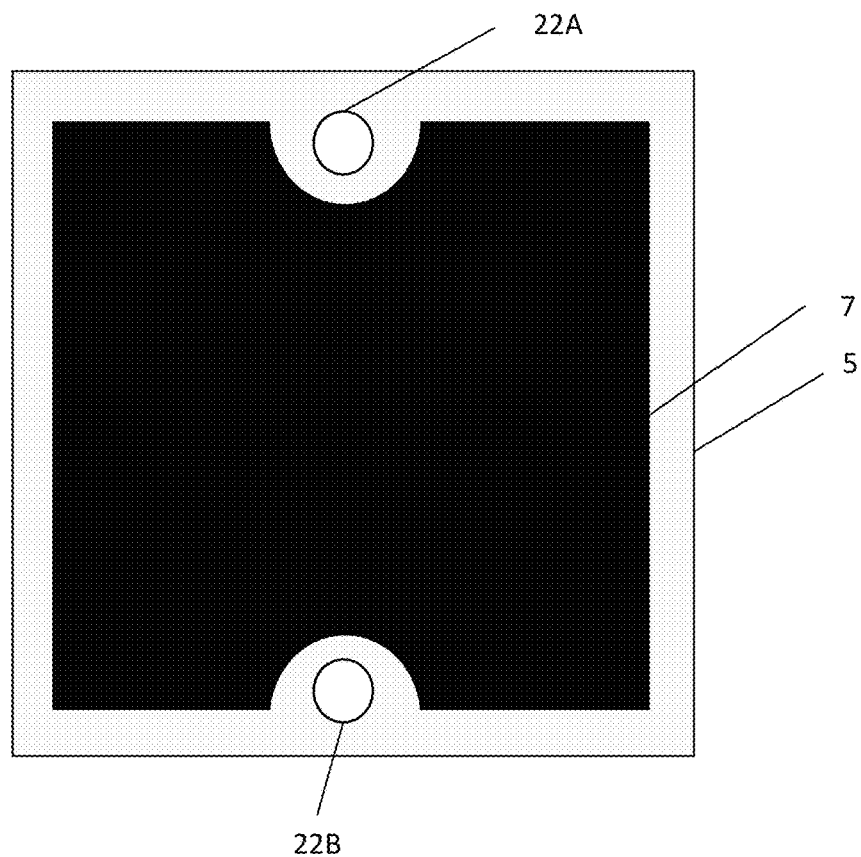
FIG. 3B is a plan view of a fuel side of the SOEC cell of FIG. 3A.

FIG. 3A is a plan view of the air side of the electrolyzer cell 1, and FIG. 3B is a plan view of the fuel side of the electrolyzer cell 1, according to various embodiments of the present disclosure. Referring to FIGS. 1A, 2A, 3A, and 3B, the electrolyzer cell 1 may include an inlet fuel hole 22A, an outlet fuel hole 22B, the electrolyte 5, and the air-side electrode 3. The air-side electrode 3 may be disposed on the air side of the electrolyte 5. The fuel-side electrode 7 may be disposed on an opposing fuel (e.g., water) side of the electrolyte 5.

The fuel holes 22A, 22B may extend through the electrolyte 5 and may be arranged to overlap with the fuel holes 22A, 22B of the interconnects 10, when assembled in the electrolyzer cell stack 100. The air-side electrode 3 may be printed on the electrolyte 5 so as not to overlap with the ring seals 20 and the peripheral seals 24 when assembled in the electrolyzer cell stack 100. The fuel-side electrode 7 may have a similar shape as the air-side electrode 3. The fuel-side electrode 7 may be disposed so as not to overlap with the frame seal 26, when assembled in the stack 100. In other words, the electrodes 3 and 7 may be recessed from the edges of the electrolyte 5, such that corresponding edge regions of the electrolyte 5 may directly contact the corresponding seals 20, 24, 26.

In one embodiment, the electrolyzer cell stack 100 may only be operated in the electrolysis mode. Thus the electrolyzer cell stack 100 is not operated in a fuel cell mode to generate power from a fuel and air provided to fuel-side and air-side electrodes, respectively. Alternatively, the electrolyzer cell stack 100 may comprise a solid oxide regenerative (i.e., reversible) fuel cell (SORFC) stack. SORFCs can be operated in a fuel cell (FC) mode (e.g., power generation mode), in order to generate electricity from fuel and air provided to fuel-side and air-side electrodes, respectively, and may be operated in an electrolyzer cell (EC) mode (e.g., electrolysis mode) in order to produce hydrogen and oxygen from water provided to the fuel-side electrode 7. In the FC mode, oxygen ions are transported from the air-side (e.g., cathode) electrode 3 to the fuel-side (e.g., anode) electrode 7 of the SORFC to oxidize the fuel (e.g., hydrogen and/or hydrocarbon fuel, such as natural gas) and to generate electricity. In EC mode, a positive potential is applied to the air side of the cell, and the oxygen ions are transported from the water at the fuel-side electrode 7 through the electrolyte 5 to the air-side electrode 3. Thus, water is electrolyzed into hydrogen at the fuel-side electrode 7 and oxygen at air-side electrode 3.

The air-side electrode 3 and the fuel-side electrode 7 of a SORFC respectively operate as a cathode and an anode during FC mode, and respectively operate as an anode and a cathode during EC mode (i.e., a FC mode cathode is an EC mode anode, and a FC mode anode is an EC mode cathode). Accordingly, the SORFCs described herein may be referred to as having air-side electrodes and fuel-side electrodes.

During the EC mode, water in the fuel stream is reduced ($H_2O+2e^- \rightarrow O_2^-+H_2$) to form $H_2$ gas and $O_2^-$ ions, the $O_2^-$ ions are transported through the solid electrolyte, and then oxidized on the air-side electrode ($O_2^-$ oxidized to $O_2$) to produce molecular oxygen. Since the open circuit voltage for a SORFC operating with air and wet fuel (e.g., hydrogen and/or reformed natural gas) may be from about 0.9 to 1.0V (depending on water content), the positive voltage applied to the air-side electrode in EC mode increases the cell voltage to typical operating voltages of from about 1.1 to 1.3V. In constant current mode, the cell voltages may increase over time if there is degradation of the cell, which may result from both ohmic sources and electrode polarization.

One of the major hurdles encountered with state-of-the-art solid oxide electrolyzer cells and SORFCs is the delamination of the air electrode at high current densities. The degree of delamination increases with the current density and the flux of oxide ion transport. Without wishing to be bound by a particular theory, it is believed that the delamination may be caused by the precipitation of oxygen at the electrolyte/cathode interface, which can lead to high pressures resulting in air electrode delamination.

Figure 4:
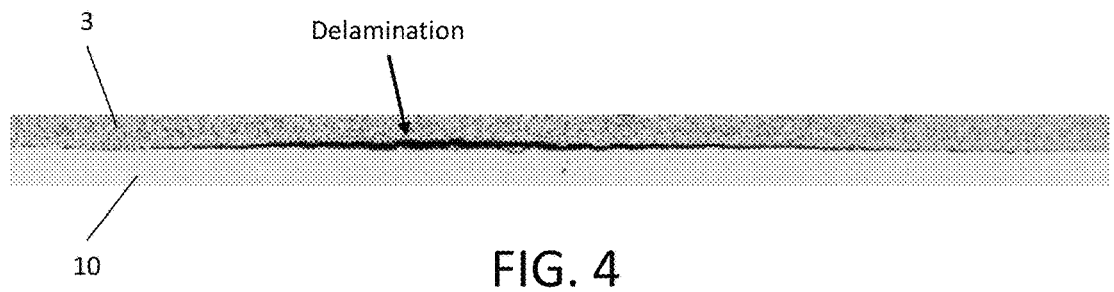
FIG. 4 is a photograph showing air electrode delamination.

FIG. 4 is a photograph showing air electrode 3 delamination after operating a solid oxide electrolyzer cell in electrolysis mode for an extended time at a high current density. As shown in FIG. 4, the air-side electrode 3 may separate from the underlying electrolyte 5, as indicated by the black area there between.

Figure 5:
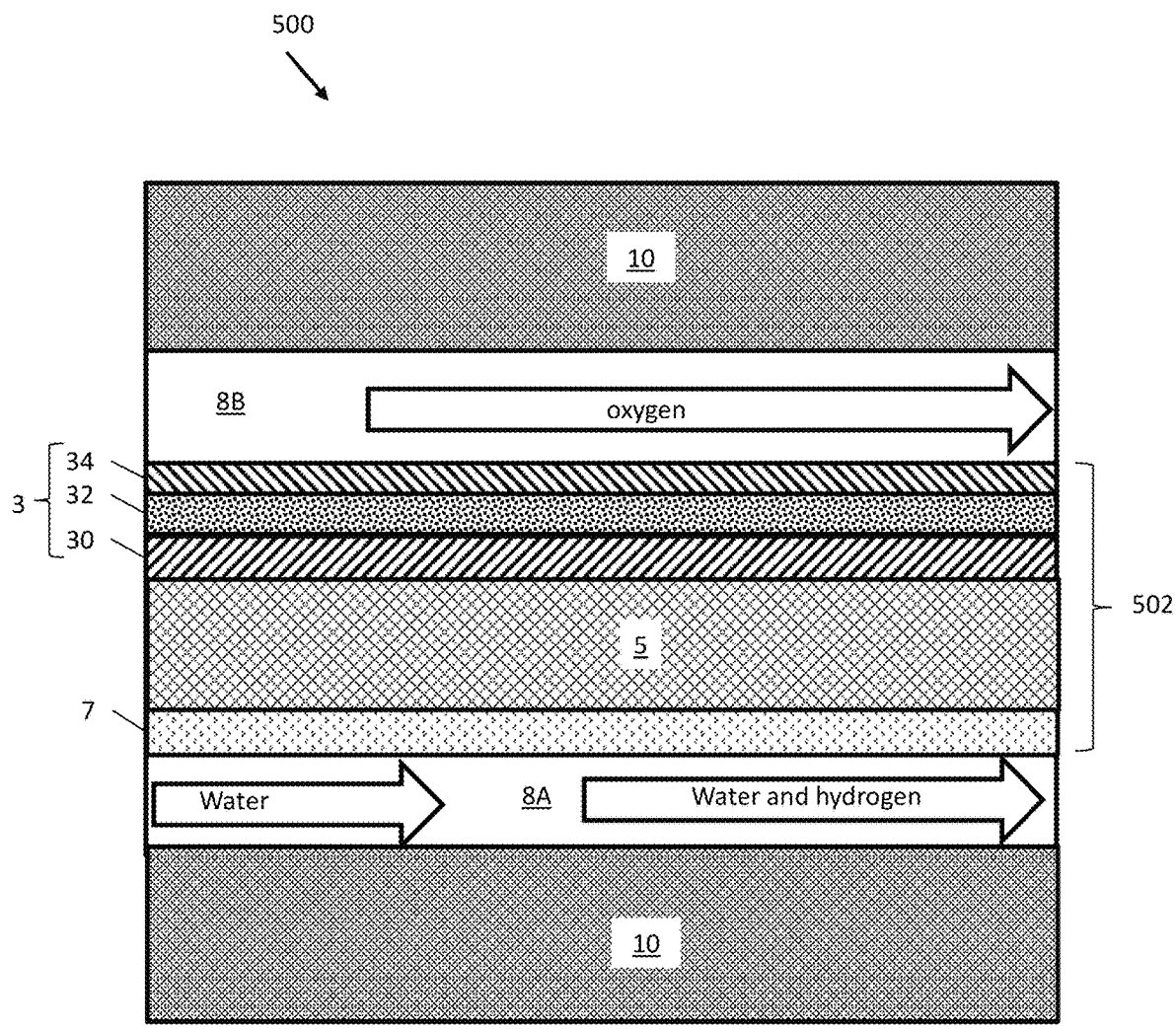
FIG. 5 is a cross-sectional view of a SOEC stack including an electrolysis-tolerant SOEC cell, according to various embodiments of the present disclosure.

FIG. 5 is a cross-sectional view of an electrolyzer cell stack 500 including an electrolysis-tolerant solid oxide electrolyzer cell 502, according to various embodiments of the present disclosure. The electrolyzer cell stack 500 is similar to the stack 100 of FIGS. 1A-3B. As such, only the differences there between will be discussed in detail.

Referring to FIG. 5, the electrolyzer cell stack 500 may include at least one electrolyzer cell 502 disposed between interconnects 10. The electrolyzer cell 502 may operate only in the electrolysis mode (e.g., the cell may comprise a solid oxide electrolyzer cell (SOEC)), or may operate in both fuel cell and electrolysis modes (e.g., the cell 502 may comprise a SORFC). The electrolyzer cell 502 includes a solid oxide electrolyte 5, an air-side electrode 3 disposed on an air side of the electrolyte 5, and a fuel-side electrode 7 disposed on a fuel side of the electrolyte 5. Air may be provided to the air-side electrode 3 by air channels 8B in a fuel cell mode, and fuel may be provided to the fuel-side electrode 7 by fuel channels 8A in the fuel cell mode, while water may be provided to the fuel-side electrode 7 by fuel channels 8A in the electrolysis mode.

In various embodiments, the electrolyte 5 may include an ionically conductive material or phase, such as a stabilized zirconia material as described above, such as SSZ, YSZ, SCSZ, SCYSZ, SCYbSZ, or the like. Alternatively, the electrolyte 5 may comprise another ionically conductive material, such as doped ceria, including scandia, gadolinia or yttria doped ceria (i.e., SDC, GDC or YDC). In some embodiments, the electrolyte 5 may comprise a material represented by the formula: $(ZrO_2)_{1-w-x-z}(Sc_2O_3)_w(CeO_2)_x(Y_2O_3)_a(Yb_2O_3)_b$, wherein $0.09 \leq w \leq 0.11$, $0 < x \leq 0.0125$, $a+b=z$, and $0.0025 \leq z \leq 0.0125$. In some embodiments, the electrolyte 5 may comprise $(ZrO_2)_{0.88}(Sc_2O_3)_{0.1}(CeO_2)_{0.01}(Yb_2O_3)_{0.01}$ or $(ZrO_2)_{0.88}(Sc_2O_3)_{0.1}(CeO_2)_{0.01}(Y_2O_3)_{0.01}$. Alternatively, the electrolyte 5 may comprise $(ZrO_2)_{0.89}(Sc_2O_3)_{0.1}(CeO_2)_{0.01}$.

The air-side electrode 3 may include a barrier layer 30 disposed on an air side of the electrolyte 5, a functional layer 32 disposed on the barrier layer 30, and an optional current collector layer 34 disposed on the functional layer 32. The functional layer 32 may include a mixture of an electrically conductive material and an ionically conductive material. For example, the functional layer 32 may include from about 10 weight percent (wt %) to about 90 wt % of the electrically conductive material described above, (e.g., LSM, LSC, LSCM, LSCF, LSF, LSCN, Pt, etc.) and from about 10 wt % to about 90 wt % of the ionically conductive material. Suitable ionically conductive materials include zirconia-based based materials. For example, the ionically conductive material may comprise yttria-stabilized zirconia (YSZ) or scandia-stabilized zirconia (SSZ) including at least one of yttria and/or ytterbia and optionally ceria. In some embodiments, the ionically conductive material may be represented by the formula: $(ZrO_2)_{1-w-x-z}(Sc_2O_3)_w(CeO_2)_x(Y_2O_3)_a(Yb_2O_3)_b$, wherein $0 \leq w \leq 0.11$, $0 \leq x \leq 0.0125$, $a+b=z$, and $0.0025 \leq z \leq 0.11$. In some embodiments, $0 \leq x \leq 0.011$ and $0.009 \leq z \leq 0.0125$, and optionally, one of a or b may be equal to zero, if the other one of a or b is not equal to zero.

In some embodiments, the functional layer 32 may include a mixture of LSM and at least one of SSZ, YSZ, scandia-ceria-ytterbia-stabilized zirconia (SCYbSZ), scandia-ceria-yttria-stabilized zirconia (SCYSZ), scandia-yttria-stabilized zirconia (SYSZ) or scandia-ytterbia-stabilized zirconia (SYbSZ). For example, YSZ may include 8 to 11 at % $Y_2O_3$ and 89 to 92 at % $ZrO_2$, such as about 8 at % $Y_2O_3$ and about 92 at % $ZrO_2$. SYSZ may include about 10 at % $Sc_2O_3$, about 1 at % $Y_2O_3$, and about 89 at % $ZrO_2$. SCYbSZ may include about 10 at % $Sc_2O_3$, about 1 at % $CeO_2$, about 1 at % $Yb_2O_3$, and about 88 at % $ZrO_2$.

The current collector layer 34 may include an electrically conductive material, such as an electrically conductive metal oxide, such as LSM. However, other conductive perovskites, such as LSC, LSCM, LSCF, LSF, LSCN, etc., or metals, such as Pt, may also be used.

The barrier layer 30 may be sintered to the air-side of the electrolyte 5 and may include at least about 95 at % of an ionically conductive material, such as from about 97 at % to about 100 at %, or from about 98 at % to about 100 at % of an ionically conductive material. The barrier layer 30 may have a relatively high ionic conductivity and a relatively low electrical conductivity. For example, the barrier layer 30 may be free of, or contain no more than a trace amount of an electrically conductive material. For example, the barrier layer 30 may comprise less than 1 at %, such as from 0 to 0.5 at %, or from 0 to 0.25 at % of an electrically material, such as a metal or electrically conductive oxide, such LSM, LSC, LSCM, LSCF, LSF, and LSCN, and less than 1 at %, such as from 0 to 0.5 at %, or from 0 to 0.25 at % ceria.

In some embodiments, the barrier layer 30 may have a lower electric conductivity than the electrolyte 5. While not wishing to be bound to any particular theory, the present inventors believe that such an electrical conductivity difference may operate to prevent and/or reduce an over-potential (e.g., increase in cell voltage) when the electrolyzer cell 500 is operated in EC mode. It is believed that preventing and/or reducing such a cell over-potential reduces and/or prevents delamination of the air-side electrode 3 during EC operation.

In some embodiments, the barrier layer 30 may include a stabilized or partially stabilized zirconia ($ZrO_2$) material, such as a rare earth stabilized (e.g., doped) zirconia, such as scandia ($Sc_2O_3$) stabilized zirconia (SSZ), a yttria ($Y_2O_3$) stabilized zirconia (YSZ), and/or ytterbia ($Yb_2O_3$) stabilized zirconia (YbSZ). In various embodiments, the barrier layer 30 may include zirconia stabilized with any combination of yttria, ytterbia, and/or scandia. For example, the barrier layer 30 may include scandia-yttria-stabilized zirconia (SYSZ) or scandia-ytterbia-stabilized zirconia (SYbSZ). In other embodiments, the barrier layer 30 may include zirconia stabilized or doped with Mg, Ca, La, and/or oxides thereof.

Various additional formulations of the barrier layer are described in U.S. patent application Ser. No. 17/120,426, the substance of which is incorporated by reference in its entirety. Some additional example embodiments will now be described.

As illustrated in FIG. 5, reversible SOFC/SOEC electrolyzer cell stack 500 includes air-side electrode 3 having barrier layer 30 disposed on an air side of electrolyte 5, functional layer 32 disposed on barrier layer 30, and current collector layer 34 disposed on functional layer 32.

According to the various embodiments, functional layer 32 can be sintered to electrolyte 5 and consist of a composite of two or more mixed ionic-electronic conductors (MIEC), such as LSCF and SDC, or LSCF and GDC, or LSC and SDC, or just one MIEC such as LSCF or LSC.

Collector layer 34 is disposed on functional layer 32 and can consist of one MIEC with high electronic conduction, such as LSCF or LSC. In the example SOFC/SOEC electrode systems, a ceria-based barrier layer 30 (SDC or GDC) resides between functional layer 32 and electrolyte 5. Electrolyte 5 can be comprised of a doped zirconia such as SSZ or YSZ. The functionally graded anode FGA (e.g., fuel-side electrode 7) is comprised of two or more layers (e.g., FGA1, FGA2) of a composite such as Ni-GDC, Ni-SDC, Ni-YSZ, or Ni-SSZ.

Other example air electrode materials can be from the LSCF, LSC, and Strontium Titanium Cobalt Ferrite (STFC) families of perovskites. One of the drawback of these perovskite materials is that they readily react with doped-zirconia electrolytes (YSZ, SSZ) at both cell sintering temperatures (e.g., between 800° C. and 1400° C.) and at SOFC/SOEC operating temperature (e.g., between 650° C. and 800° C.). The La (Lanthanum) from the perovskites reacts with the zirconia to form resistive phases including $La_2Zr_2O_7$ and the Sr (Strontium) reacts to form resistive phases including $SrZrO_3$, for example.

Therefore, barrier 30 is required between functional layer 32 (e.g., containing LSCF) and electrolyte 5. The MIEC doped-ceria (SDC or GDC) has limited reactivity with these perovskite phases and makes a suitable barrier layer. In order for barrier layer 30 to be effective, it should be as dense as possible with little or no connected open porosity. If barrier layer 30 contains porosity, the Sr can transport via vapor phase and/or diffusion through the ceria barrier layer and react with the zirconia based electrolyte. Therefore, the SDC or GDC barrier layer 30 should be densified before the application and sintering of functional layer 32. These perovskite materials have sintering temperatures below that of the barrier layer materials (SDC or GDC) and below that of the composite FGA (NiO-GDC or NiO-SDC). Therefore, if the ceria barrier layer is co-sintered with functional layer 32, then a variety of effects can occur. First, the Sr can transport to the electrolyte before the barrier layer densifies. Second, if the sintering temp is above optimal for the perovskite, functional layer 32 can over densify and have inadequate porosity for optimal performance. And thirdly, if the sintering temp is below optimal for ceria, the barrier layer cannot densify and protection during operation is sacrificed.

The preferred sintering temperature windows for the different materials are approximately:

Porous functional layer 32 containing perovskite materials (LSCF, LSC, STFC): 800-1150° C.;
Dense barrier layers (SDC, GDC): 1190-1400° C.; and
FGA (NiO-SDC): 1100-1400° C.

As shown above, the sintering windows for a dense ceria barrier layer 30 and a porous functional layer 32 layer do not overlap. However, there is some overlap between the sintering windows for functional layer 32 and FGA such that they can be co-sintered. Accordingly, inventors have developed various cell fabrication processes.

Figure 6:
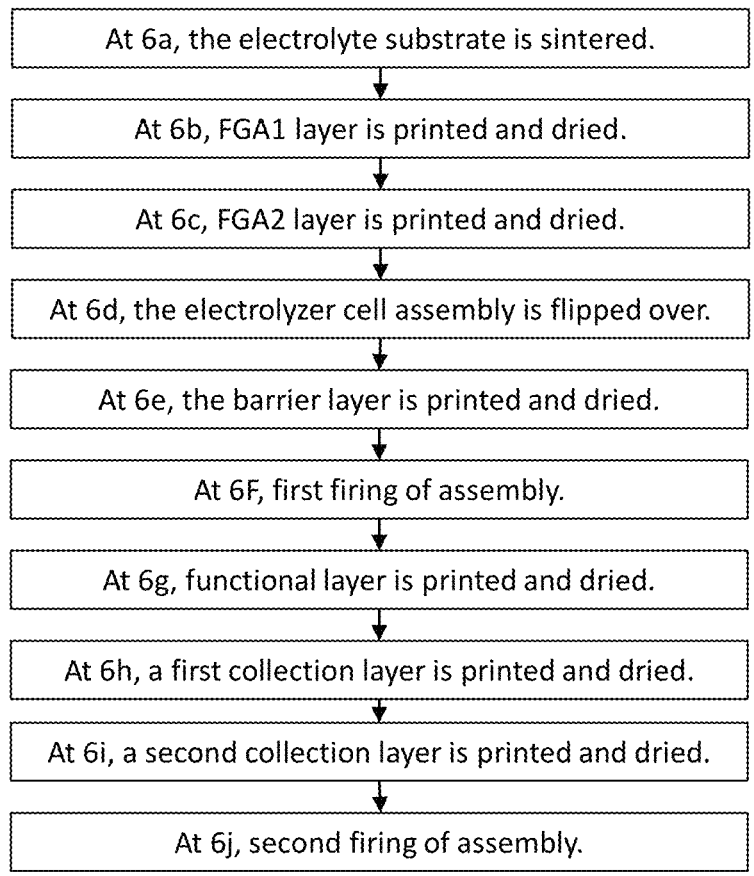
FIG. 6 is a cell fabrication process according to various embodiments of the present disclosure.

FIG. 6 is a cell fabrication process 600 according to various embodiments of the present disclosure. At 6a, the electrolyte substrate is sintered. At 6b, FGA1 layer is printed and dried. Optionally, at 6c, FGA2 layer is printed and dried. At 6d, the electrolyzer cell assembly is flipped over. On the reverse side, at 6e, the barrier layer is printed and dried. Here, cell fabrication process 600 prints and dries the ceria (SDC or GDC) barrier layer. At 6F, the first firing of the assembly occurs. For example, the first firing (e.g., sintering) can be at 1190° C. for 1 h. The first firing can be anywhere between 1190° C. and 1400° C. for a duration between 0.5 hours and 4.0 hours. Next, at 6g, cell fabrication process 600 prints and dries the functional layer. At 6h, a first collector layer is printed and dried. At 6i, an optional second collector layer is printed and dried. Lastly, at 6j, the second firing of the assembly occurs. The second firing can occur at 875° C., or can be anywhere between 800° C. and 1150° C. for a duration between 0.5 hours and 2.0 hours.

Figure 7:
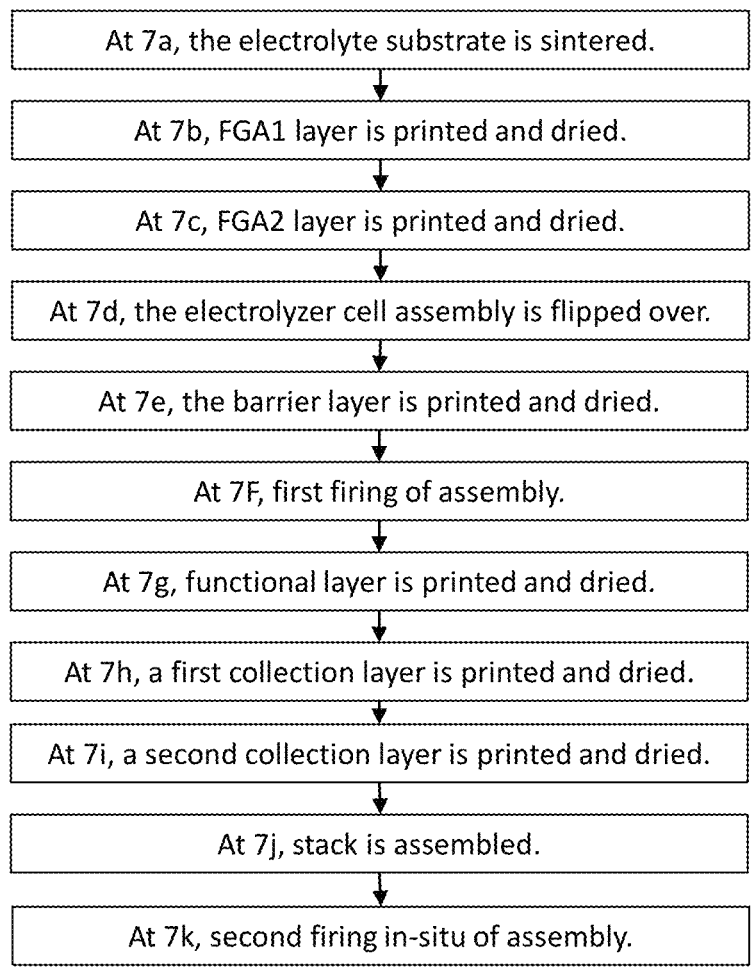
FIG. 7 is a cell fabrication process according to various embodiments of the present disclosure.

FIG. 7 is a cell fabrication process 700 according to various embodiments of the present disclosure. At 7a, the electrolyte substrate is sintered. At 7b, FGA1 layer is printed and dried. Optionally, at 7c, FGA2 layer is printed and dried. At 7d, the electrolyzer cell assembly is flipped over. On the reverse side, at 7e, the barrier layer is printed and dried. Here, cell fabrication process 700 prints and dries the ceria (SDC or GDC) barrier layer. At 7F, the first firing (e.g., sintering) of the assembly occurs. For example, the first firing can be at 1190° C. for 1 h. The first firing can be anywhere between 1190° C. and 1400° C. for a duration between 0.5 hours and 4.0 hours. Next, at 7g, cell fabrication process 600 prints and dries the functional layer. At 7h, a first collector layer is printed and dried. At 7i, an optional second collector layer is printed and dried. Next, at 7j, the stack (e.g., stack 100) is assembled. Lastly, at 7k, a second electrode firing occurs in-situ stack during stack sintering, such as at 940° C. for 4 hr. The stack sintering can be between 800° C. and 1000° C. for a duration between 0.5 hours and 6 hours.

Figure 8:
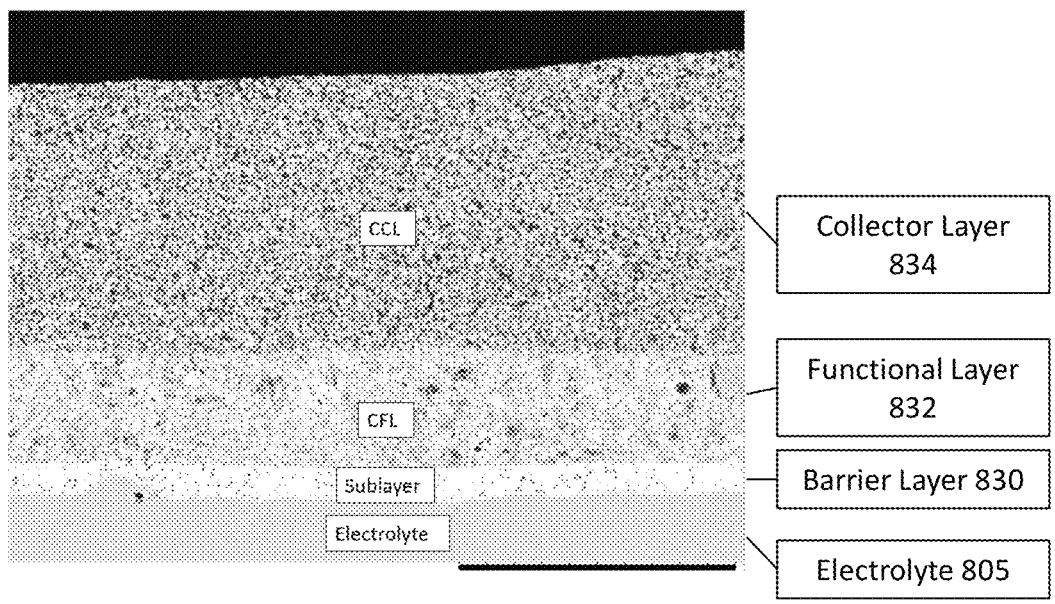
FIG. 8 illustrates an air-side electrode according to various embodiments of the present disclosure

FIG. 8 illustrates an air-side electrode 803 according to various embodiments of the present disclosure. Air-side electrode 803 includes electrolyte 805, barrier layer 830, functional layer 832, and collector layer 834.

In the various embodiments, the lanthanum strontium cobalt ferrite (LSCF) material can be represented by the formula $(La_xSr_{1-x})_yCo_zFe_{1-z}O_{3-\delta}$, wherein x ranges from 0.4 to 0.8, y ranges from 0.94 to 1.0, z ranges from 0.01 to 0.99, and δ is an equilibrium oxygen deficiency which ranges from 0 to 0.1. Example compositions include $La_{0.58}Sr_{0.4}Co_{0.2}Fe_{0.8}O_{3-\delta}$, $(La_{0.6}Sr_{0.4})_{0.98}Co_{0.2}Fe_{0.8}O_{3-\delta}$, and $(La_{0.6}Sr_{0.4})_{0.95}Co_{0.2}Fe_{0.8}O_{3-\delta}$.

The lanthanum strontium cobalt oxide (LSC) material can be represented by the formula $(La_xSr_{1-x})_yCoO_{3-\delta}$, wherein x ranges from 0.4 to 0.8, y ranges from 0.94 to 1.0, and δ is an equilibrium oxygen deficiency which ranges from 0 to 0.1. Example compositions include $La_{0.6}Sr_{0.4}CoO_{3-\delta}$, $(La_{0.6}Sr_{0.4})_{0.99}CoO_{3-\delta}$, and $(La_{0.8}Sr_{0.2})_{0.97}CoO_{3-\delta}$.

The Strontium Titanium Cobalt Ferrite (STFC) material can be represented by the formula $Sr(Ti_xFe_yCo_z)O_{3-\delta}$, wherein x ranges from 0.25 to 0.35, y ranges from 0.53 to 0.75, z ranges from 0 to 0.17, and δ is an equilibrium oxygen deficiency which ranges from 0.1 to 0.39. Example compositions include $Sr(Ti_{0.3}Fe_{0.7})O_{3-\delta}$, $Sr(Ti_{0.3}Fe_{0.63}Co_{0.7})O_{3-\delta}$, and $Sr(Ti_{0.3}Fe_{0.55}Co_{0.15})O_{3-\delta}$.

The barrier layer can be comprised of Sm-doped Ceria such as $Ce_{0.8}Sm_{0.2}O_{2-d}$, $Ce_{0.9}Sm_{0.1}O_{2-d}$, or $Ce_{0.7}Sm_{0.3}O_{2-d}$, and including $Ce_{1-x}Sm_xO_{2-d}$ with x=0.1 to 0.3. Alternatively, the barrier layer can be made from Gd-doped Ceria such as $Ce_{0.9}Gd_{0.1}O_{2-d}$, $Ce_{0.8}Gd_{0.2}O_{2-d}$, or $Ce_{0.7}Gd_{0.3}O_{2-d}$, and including $Ce_{1-x}Gd_xO_{2-d}$ for x=0.1 to 0.3. The ceria in the barrier layer and in the CFL can be the same composition or a different composition, such that the following combinations are possible including GDC sublayer with LSCF/GDC CFL, GDC sublayer with LSCF/SDC CFL, SDC sublayer with LSCF/SDC CFL, and SDC sublayer with LSCF/GDC CFL. In order to achieve sufficient sublayer layer density at the indicated temperature window for sintering, 0.4 wt % Cobalt Nitrate $Co(NO_3)_2$ is added.

The zirconia electrolyte can be comprised of YSZ, such as $Zr_{1-x}Y_xO_{3-d}$ for x=0.05 to x=0.3 and including 8 mol % $Y_2O_3$-92 mol % $ZrO_2$ and 10 mol % $Y_2O_3$-90 mol % $ZrO_2$. Other compositions include Scandia doped-zirconia such as 10 mol % $Sc_2O_3$-1 mol % $CeO_2$-89 mol % $ZrO_2$ and 10 mol % $Sc_2O_3$-1 mol % $CeO_2$-1 mol % $Yb_2O_3$-88 mol % $ZrO_2$.

In the various embodiments, a FGA1 layer ranges in thickness between 5-9 microns. The FGA1 composite (Ni-SDC or Ni-GDC) expressed as $Ni_x$:(SDC or GDC)$_{1-x}$, x ranges from 0.15 to 0.25. Example compositions includes $Ni_{0.2}$:$SDC_{0.8}$.

The FGA2 layer ranges in thickness between 18-30 microns. The FGA2 composite (Ni-SDC or Ni-GDC) expressed as $Ni_x$:(SDC or GDC)$_{1-x}$, x ranges from 0.7 to 0.8. Example composition includes $Ni_{0.75}$:$SDC_{0.25}$.

The barrier layer can range in thickness between 4.5-12 microns.

The functional layer 32 can range in thickness between 18-35 microns. Functional layer 32 can be a ceramic composite can be expressed as a ratio of (LSCF or LSC or STFC) material to SDC or GDC material by weight (SDC or GDC)$_x$:(LSCF or LSC or STFC)$_{1-x}$, where x ranges from 0 to 0.6.

The collecting layer 34 can range in thickness between 25-65 microns. The range is relatively large as some embodiments will not contain a second collector layer print.

Figure 9:
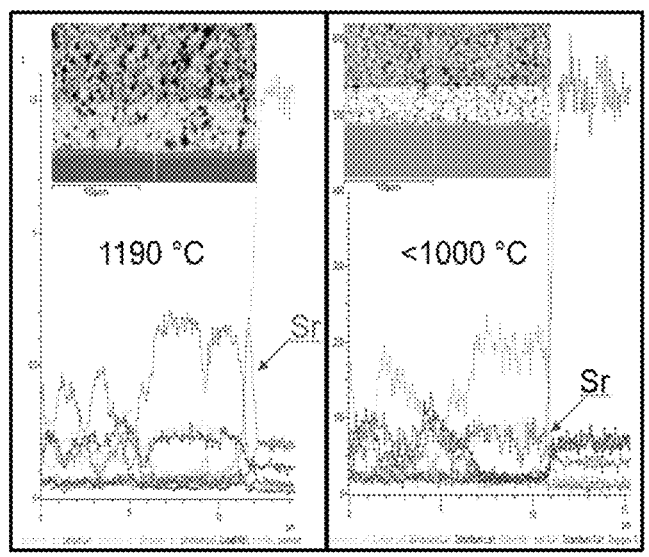
FIG. 9 illustrates energy dispersive x-ray spectroscopy data according to various embodiments of the present disclosure.

FIG. 9 illustrates energy dispersive x-ray spectroscopy data 900 according to various embodiments of the present disclosure. The energy dispersive x-ray spectroscopy data 900 illustrates the effectiveness of the barrier layer (e.g., 30, 830) using the cell fabrication process described herein. In particular, the level of Strontium in the electrolyte (e.g., electrolyte 5) is substantially reduced.

It will be apparent to those skilled in the art that various modifications and variations can be made in the optimized cell processing scheme for electrodes for SOFC and SOEC of the present invention without departing from the spirit or scope of the invention. Thus, it is intended that the present invention cover the modifications and variations of this invention provided they come within the scope of the appended claims and their equivalents.

What is claimed is:

1. A method of fabricating a solid oxide electrolyzer cell (SOEC), the method comprising:
   sintering an electrolyte comprising a stabilized zirconia material;
   printing a fuel-side electrode comprising a cermet including a metal-containing phase and a ceramic phase on a fuel side of the electrolyte and printing a barrier layer comprising a samaria-doped ceria (SDC) material on an air side of the electrolyte to form a printed electrolyte;
   sintering the printed electrolyte, at between 1190° C. and 1400° C. for a duration of between 0.5 hours and 4 hours, to sinter the printed fuel-side electrode including the cermet and densify the printed barrier layer during a same first sintering step;
   printing a functional layer comprising a SDC material and an electrically conductive lanthanum strontium cobalt ferrite (LSCF) material on the densified barrier layer and printing a first collector layer on the functional layer after the first sintering step to form an electrolyzer cell; and
   sintering the electrolyzer cell comprising the printed functional layer and the printed first collector layer, at between 800° C. and 1000° C. for a duration between 0.5 hours and 6 hours, during a same second sintering step after placing the electrolyzer cell into a SOEC stack.

2. The method of fabricating a SOEC according to claim 1, further comprising printing a second collector layer on the first collector layer.

3. The method of fabricating a SOEC according to claim 1, wherein the fuel-side electrode has two or more layers.

4. The method of fabricating a SOEC according to claim 1, further comprising printing an electrically conductive contact layer on the functional layer or on the fuel-side electrode.

5. The method of fabricating a SOEC according to claim 1, wherein the stabilized zirconia material comprises at least one of scandia-stabilized zirconia (SSZ), yttria-stabilized zirconia (YSZ), scandia-ceria-stabilized zirconia (SCSZ), scandia-ceria-yttria-stabilized zirconia (SCYSZ), and scandia-ceria-ytterbia-stabilized zirconia (SCYbSZ).

6. The method of fabricating a SOEC according to claim 1, further comprising densifying the barrier layer using cobalt nitrate $Co(NO_3)_2$.

7. A method of fabricating a solid oxide electrolyzer cell (SOEC), the method comprising:
   printing a fuel-side electrode comprising a cermet including a metal-containing phase and a ceramic phase on a fuel side of an electrolyte and printing a barrier layer comprising a samaria-doped ceria (SDC) material on an air side of the electrolyte to form a printed electrolyte;
   sintering the printed electrolyte, at between 1190° C. and 1400° C. for a duration of between 0.5 hours and 4 hours, to sinter the printed fuel-side electrode including the cermet and densify the printed barrier layer during a same first sintering step;
   printing a functional layer comprising a SDC material and an electrically conductive lanthanum strontium cobalt ferrite (LSCF) material on the densified barrier layer and printing a first collector layer on the functional layer to form an electrolyzer cell;
   stacking the electrolyzer cell and additional electrolyzer cells that include un-sintered first collector and functional layers between interconnects to form an SOEC stack; and
   heating the SOEC stack, at between 800° C. and 1000° C. for a duration between 0.5 hours and 6 hours, to sinter the un-sintered first collector and functional layers of the electrolyzer cells during a same second sintering step.

8. The method of fabricating a SOEC according to claim 7, wherein the electrolyte comprises a stabilized zirconia including at least one of scandia-stabilized zirconia (SSZ), yttria-stabilized zirconia (YSZ), scandia-ceria-stabilized zirconia (SCSZ), scandia-ceria-yttria-stabilized zirconia (SCYSZ), and scandia-ceria-ytterbia-stabilized zirconia (SCYbSZ).

9. The method of fabricating a SOEC according to claim 7, further comprising densifying the barrier layer using cobalt nitrate $Co(NO_3)_2$.

10. A method of fabricating a solid oxide electrolyzer cell (SOEC), the method comprising:
    printing a fuel-side electrode comprising a cermet including a metal-containing phase and a ceramic phase on a fuel side of an electrolyte and printing a barrier layer comprising a samaria-doped ceria (SDC) material on an air side of the electrolyte to form a printed electrolyte;
    sintering the printed electrolyte, at between 1190° C. and 1400° C. for a duration of between 0 hours and 4 hours, to sinter the printed fuel-side electrode including the cermet and densify the printed barrier layer during a same first sintering step;
    printing a functional layer comprising a samaria-doped ceria (SDC) material and an electrically conductive lanthanum strontium cobalt ferrite (LSCF) material on the densified barrier layer and printing a first collector layer on the functional layer to form an electrolyzer cell; and
    sintering the electrolyzer cell comprising the printed functional layer and the printed first collector layer, at between 800° C. and 1000° C. for a duration between 0.5 hours and 6 hours, during a same second sintering step.

11. The method of fabricating a SOEC according to claim 10, wherein:
    the electrolyte comprises a stabilized zirconia including at least one of scandia-stabilized zirconia (SSZ), yttria-stabilized zirconia (YSZ), scandia-ceria-stabilized zirconia (SCSZ), scandia-ceria-yttria-stabilized zirconia (SCYSZ), and scandia-ceria-ytterbia-stabilized zirconia (SCYbSZ).

12. The method of fabricating a SOEC according to claim 10, further comprising densifying the barrier layer using cobalt nitrate $Co(NO_3)_2$.

13. A solid oxide electrolyzer cell (SOEC) stack, comprising:
    interconnects; and
    a plurality of SOECs fabricated according to claim 1 and separated by the interconnects.

14. The SOEC stack of claim 13, wherein the SOEC stack is configured to alternately operate in a fuel cell mode and an electrolysis mode.

* * * * *